US009552048B2

(12) United States Patent
Maesono

(10) Patent No.: US 9,552,048 B2
(45) Date of Patent: Jan. 24, 2017

(54) ELECTRONIC SYSTEM IN WHICH USB DEVICE CAN INFORM OCCURRENCE OF EVENT TO HOST DEVICE WITHOUT RECEIVING STATUS REQUEST FROM HOST DEVICE

(71) Applicant: KYOCERA Document Solutions Inc., Osaka-shi (JP)

(72) Inventor: Yuya Maesono, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/720,039

(22) Filed: May 22, 2015

(65) Prior Publication Data

US 2015/0338897 A1 Nov. 26, 2015

(30) Foreign Application Priority Data

May 23, 2014 (JP) .................... 2014-106631

(51) Int. Cl.
G06F 1/00 (2006.01)
G06F 1/32 (2006.01)
G06F 13/40 (2006.01)

(52) U.S. Cl.
CPC ............. *G06F 1/325* (2013.01); *G06F 1/3206* (2013.01); *G06F 1/3215* (2013.01);
(Continued)

(58) Field of Classification Search
None
See application file for complete search history.

(56) References Cited

U.S. PATENT DOCUMENTS 6,662,301 B1   12/2003  Sekine et al.
7,185,132 B2 *  2/2007  Tang ..................... G06F 13/385
                                              710/105

(Continued)

FOREIGN PATENT DOCUMENTS

JP   2001-067156 A   3/2001
JP   2005-196352 A   7/2005
JP   2010-94942 A    4/2010

OTHER PUBLICATIONS

An Office Action; "Notice of Reasons for Rejection," issued by the Japanese Patent Office on Apr. 19, 2016, which corresponds to Japanese Patent Application No. 2014-106631 and is related to U.S. Appl. No. 14/720,039.

*Primary Examiner* — Nitin Patel
(74) *Attorney, Agent, or Firm* — Studebaker & Brackett PC

(57) ABSTRACT

A pull-up resistor of an electronic device pulls up a potential of a USB signal line that is for connection with a host, thereby allowing the host to detect a communication speed. In response to a status request from the host in a normal power mode, a transmission-reception section transmits a status response indicating a switchable status when the electronic device is switchable to a power saving mode. A control section performs switching to the power saving mode after the host suspends transmission of the status request upon receipt of the status response, and performs switching to the normal power mode in response to a specific event within the electronic device in the power saving mode. A switch disables the pull-up to inform the host about disconnection, and enables the pull-up to inform the host that the connection is re-established, thereby causing transmission of the status request to be resumed.

3 Claims, 3 Drawing Sheets

(52) U.S. Cl.
CPC .. *G06F 13/4081* (2013.01); *G06F 2213/0042* (2013.01); *Y02B 60/1228* (2013.01); *Y02B 60/1235* (2013.01)

(56) References Cited

U.S. PATENT DOCUMENTS

| | | | |
|---|---|---|---|
| 2003/0172312 A1* | 9/2003 | Takahashi | G06F 1/266 713/300 |
| 2004/0073819 A1 | 4/2004 | Sekine et al. | |
| 2006/0015759 A1 | 1/2006 | Sekine et al. | |
| 2008/0215765 A1* | 9/2008 | Butler | G06F 1/3203 710/15 |
| 2010/0106863 A1 | 4/2010 | Kuronuma | |
| 2010/0250820 A1* | 9/2010 | Gaalaas | G06F 13/4072 710/305 |

* cited by examiner

ELECTRONIC SYSTEM IN WHICH USB DEVICE CAN INFORM OCCURRENCE OF EVENT TO HOST DEVICE WITHOUT RECEIVING STATUS REQUEST FROM HOST DEVICE

INCORPORATION BY REFERENCE

The present application claims priority under 35 U.S.C. §119 to Japanese Patent Application No. 2014-106631, filed May 23, 2014. The contents of this application are incorporated herein by reference in their entirety.

BACKGROUND

The present disclosure relates to electronic devices connectable to a host computer through a universal serial bus (USB).

In recent years, universal serial buses (USBs) have been used to connect a host computer (hereinafter, may be referred to as a USB host) such as a personal computer (PC) to peripheral devices (hereinafter, may be referred to as USB devices) such as a mouse, keyboard, scanner, and printer.

In recent years, not only host computers, but also an increasing number of peripheral devices have been provided with a power saving mode of operating on low power for reduced power consumption.

A peripheral device connected to a host computer through a USB receives a status request issued by the host computer at a fixed time interval. In response to the status request, the peripheral device needs to issue a response indicating the status of the peripheral device. Therefore, the peripheral device cannot stay continuously in the power saving mode for a long time.

The following describes one example of a system that solves the above problem and allows peripheral devices to stay continuously in power saving mode for a long time. In the system, when a printer is in a status switchable to the power saving mode, the printer informs a host computer about the switchable status. In response, the host computer suspends a specific USB thereof to which the printer is connected. Thus, the host computer transmits no further status request to the printer.

While the USB port is suspended, the printer connected to the USB port receives no further status request from the host computer. This allows the printer to stay continuously in the power saving mode for a long time.

SUMMARY

An electronic device according to one aspect of the present disclosure includes a transmission-reception section, a pull-up resistor, a switch, and a control section. The transmission-reception section communicates with a host through a USB signal line that is for connection with the host. The pull-up resistor pulls up a potential of the USB signal line to a predetermined level so as to allow the host to detect a speed of the communication. The switch enables or disables the pull-up by the pull-up resistor. The control section switches the electronic device between a normal power mode and a power saving mode. In response to a status request received from the host in the normal power mode, the transmission-reception section transmits to the host a status response. When the electronic device is in a status switchable to the power saving mode, the status response transmitted by the transmission-reception section indicates that the electronic device is in the switchable status. The control section performs the switching to the power saving mode after transmission of the status request by the host is suspended upon receipt of the status response by the host, performs the switching to the normal power mode in response to occurrence of a specific event within the electronic device in the power saving mode, and controls the switch. Under control of the control section, the switch disables the pull-up to inform the host that the connection is disconnected, and enables the pull-up to inform the host that the connection is re-established so as to cause the host to resume transmission of the status request.

DETAILED DESCRIPTION

With reference to the accompanying drawings, an embodiment of the present disclosure is described. The following description is given on precondition that the USB in the present embodiment is compliant with the USB specification 2.0 unless otherwise specified. However, the USB specification may be USB 3.0 or a later version than USB 3.0.

When a USB device is in a power saving mode, the USB port to which the USB device is connected is suspended. The host computer transmits no status request to the USB device while the USB port is suspended.

[Structure of Electronic Device]

Figure 1:
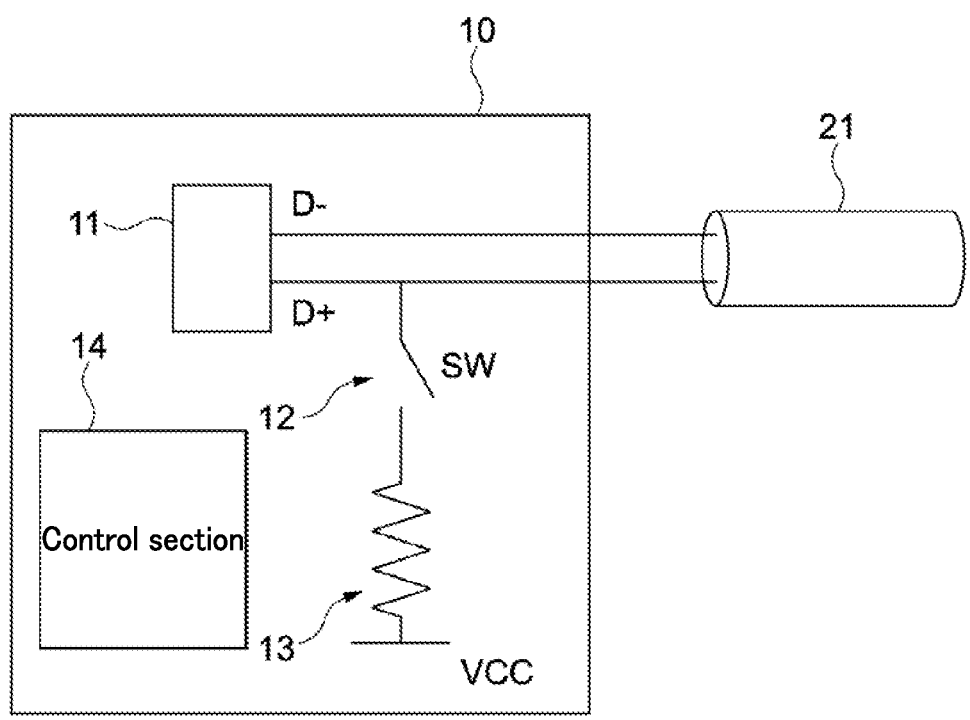
FIG. 1 is a schematic diagram illustrating an electronic device according to an embodiment of the present disclosure.

First, the structure of an electronic device according to the embodiment of the present disclosure is described. FIG. 1 is a schematic diagram illustrating an electronic device 10 of the present disclosure. In the following description, the host computer may be referred to as a USB host, and the electronic device 10 may be referred to as a USB device.

The electronic device 10 is a peripheral device of the host computer. The electronic device 10 is connected to the host computer (serving as a host) through a USB cable 21 (serving as a USB signal line). The electronic device 10 may for example be a printer. The electronic device 10 includes a transmission-reception section 11, a switch 12, a pull-up resistor 13, and a control section 14.

The USB cable 21 includes a signal line D+ and signal line D−. The USB cable 21 is used to connect the electronic device 10 to the host computer.

The transmission-reception section 11 performs signal transmission to and from the host computer using the signal lines D+ and D− in accordance with the USB specification. In other words, the transmission-reception section 11 communicates with the host computer through the signal lines D+ and D−. The electronic device 10 receives a status request from the host computer. In response to a status request received while in a normal power mode, the transmission-reception section 11 transmits a status response to the host computer. In the present embodiment, a "status response" transmitted to the host computer indicates the status of the USB device connected to the host computer through a USB connection. The "status" indicates the state of the USB device. In one example, a status response that the electronic device 10 transmits is information indicating that the electronic device 10 is in the state switchable to the power saving mode. In the normal power mode, when the electronic device 10 is in a status switchable to the power saving mode, the transmission-reception section 11 transmits a status response indicating the switchable status.

The pull-up resistor 13 allows the host computer to detect the speed of communication with the electronic device 10. More specifically, the control section 14 controls the pull-up resistor 13 to pull up the potential of the signal line D+ or D− to a predetermined level in order to inform the host computer about the transfer rate of the electronic device 10. The transfer rate refers to the speed at which the transmission-reception section 11 transmits and receives signals with respect to the host computer. That is, the transfer rate refers to the speed at which the transmission-reception section 11 communicates with the host computer. In the configuration shown in FIG. 1, by pulling up the potential of the signal line D+ through the pull-up resistor 13, the electronic device 10 informs the host computer that the electronic device 10 is ready to communicate at a full or high transmission rate. However, the electronic device 10 is not limited to this configuration and the pull-up resistor 13 may pull up the potential of the signal line D− instead.

The switch 12 is connected in series with the signal line D+ or D− that is to be pulled up and the pull-up resistor 13. The switch 12 enables and disables the pull-up of the signal line D+ or D− under the control of the control section 14. That is, instructions to enable and disable the pull-up are issued by the control section 14.

The control section 14 performs overall control of the electronic device 10 and also controls the transmission-reception section 11 to communicate with the host computer and the switch 12 to enable or disable the pull-up. The overall control of the electronic device 10 includes the control of the switching of the electronic device 10 between the power saving mode and the normal power mode.

Through the above, the structure of the electronic device according to the embodiment of the present disclosure has been described.

[Structure of Host Computer]

Next, the structure of the host computer is briefly described. A typical personal computer (PC) is usable as the host computer. Therefore, a detailed description of the host computer is omitted.

Normally, the host computer transmits a status request to the electronic device 10. According to the embodiment of the present disclosure, the host computer connected to the electronic device 10 using a USB suspends transmission of a status request when a response from the electronic device 10 indicates that the electronic device 10 is in the status switchable to the power saving mode.

Through the above, the structure of the host computer has been briefly described.

[Processing for Switching to Power Saving Mode]

Figure 2:
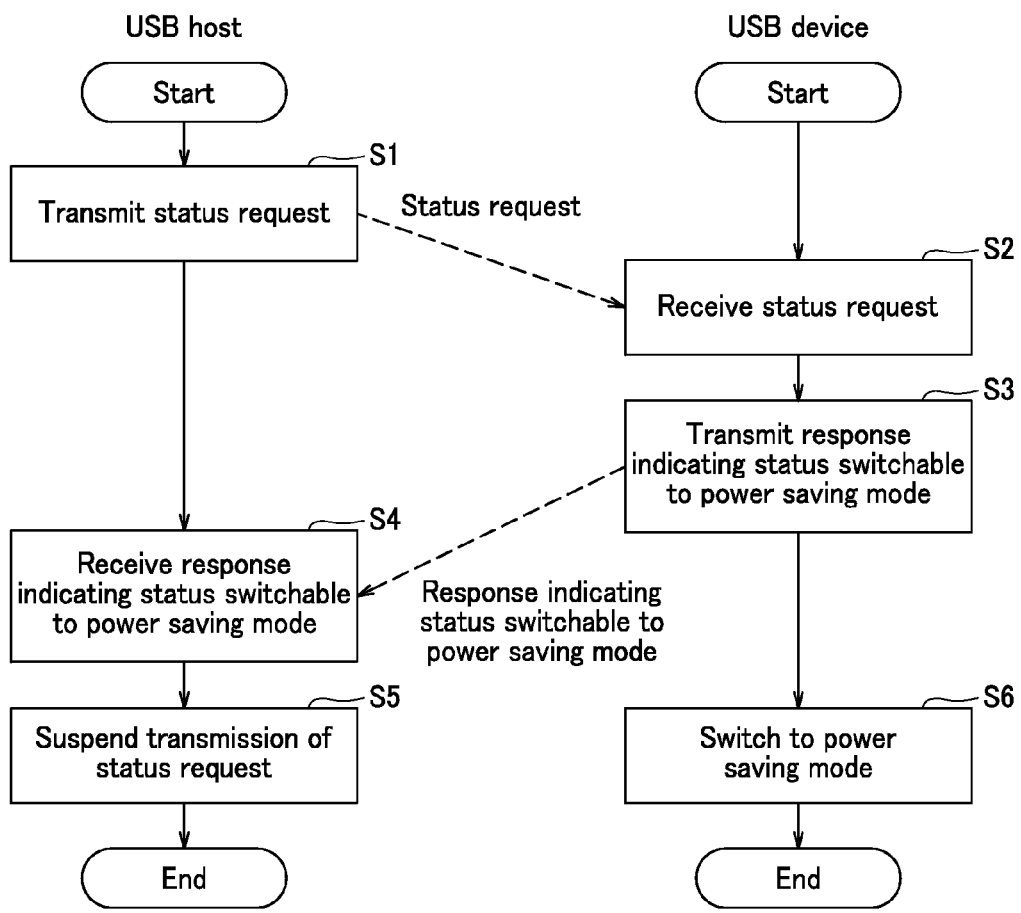
FIG. 2 is a flowchart of processing performed by the electronic device and a host computer when the electronic device switches from a normal power mode to a power saving mode.

The following describes the flow of processing performed by the host computer and the electronic device 10 for switching the electronic device 10 from the normal power mode to the power saving mode. FIG. 2 is a flowchart of processing performed by the host computer and the electronic device 10 when the electronic device 10 switches from the normal power mode to the power saving mode. In the figures and the following description, the host computer is referred to as a USB host and the electronic device 10 is referred to as a USB device.

First, the control section of the USB host transmits a status request to the USB device (Step S1).

Next, the control section 14 of the USB device receives the status request through the transmission-reception section 11 (Step S2).

When the USB device is in the status switchable to the power saving mode, the control section 14 of the USB device controls the transmission-reception section 11 to transmit a response indicating that the USB devices is in the status switchable to the power saving mode (Step S3). In an example in which the USB device is a printer, the status in which the USB device is switchable to the power saving mode refers to a status in which no print job or user operation has occurred for a predetermined time period.

Next, the control section of the USB host receives the status response indicating that the USB device is switchable to the power saving mode (Step S4).

Next, the control section of the USB host suspends transmission of a status request to the USB device (Step S5).

Next, the control section 14 of the USB device switches the USB device to the power saving mode after the control section of the USB host suspends transmission of a status request (Step S6). Since no status request is received from the USB host, there is no need for the control section 14 to transmit a status response. This allows the USB device to stay continuously in the power saving mode. The control section 14 of the USB device determines that the USB host has suspended transmission of a status request when, for example, no status request is received from the control section of the USB host for a predetermined time period.

Up to this point, the description is given of the flow of processing performed by the host computer and the electronic device 10 when the electronic device 10 switches from the normal power mode to the power saving mode.

[Processing for Resuming Transmission of Status Request]

Figure 3:
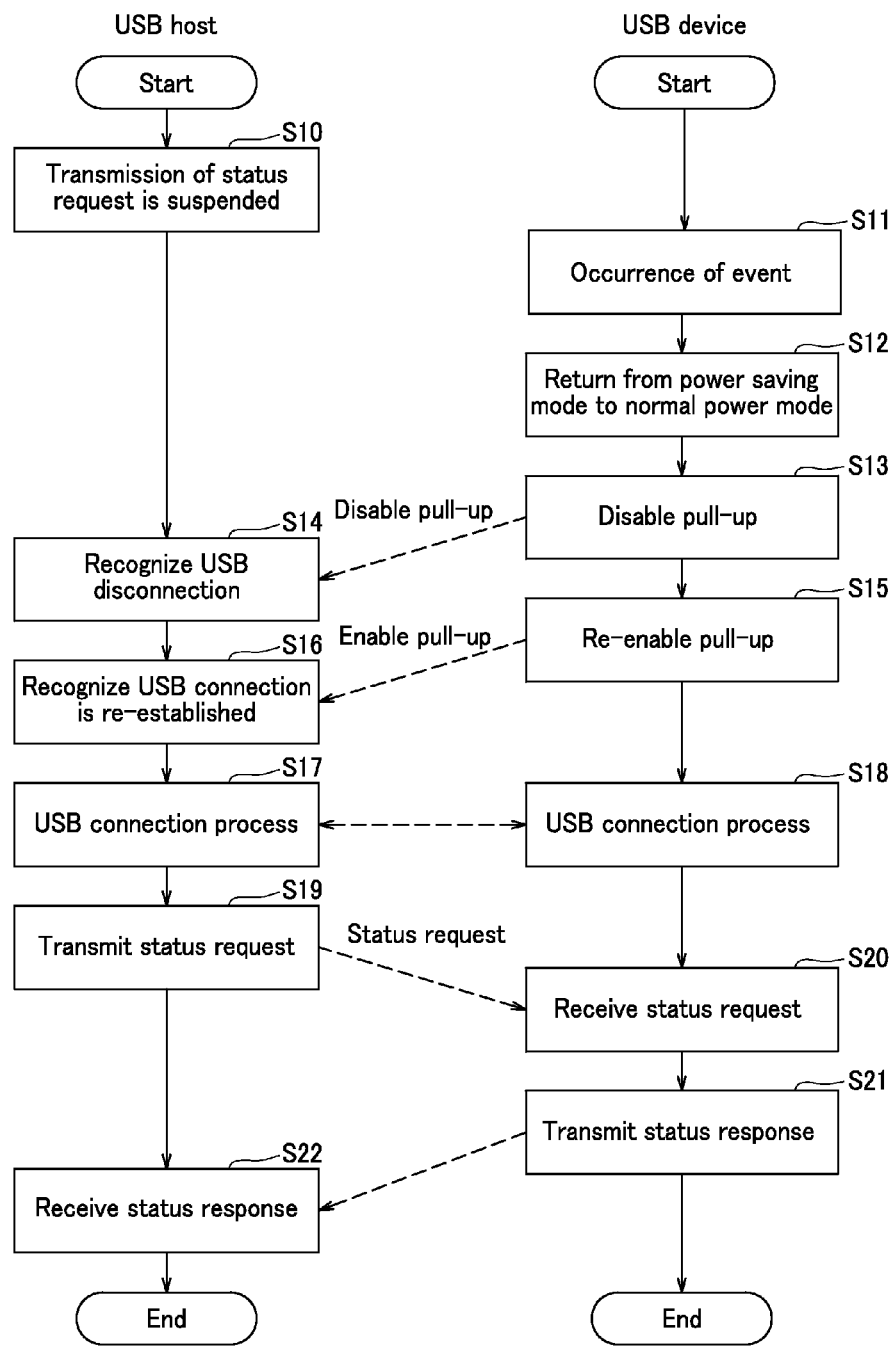
FIG. 3 is a flowchart of processing performed by the electronic device and the host computer when the host computer resumes transmission of a status request to the electronic device.

Next, the following describes the flow of processing performed when the host computer (USB host) resumes transmission of a status request to the electronic device 10 (USB device). FIG. 3 is a flowchart of processing performed when the host computer (USB host) resumes transmission of a status request to the electronic device 10 (USB device).

The following description is given on precondition that the USB device is in the power saving mode and thus transmission of a status request to the USB device by the USB host is currently suspended (Step S10).

First, an event triggering the USB device to return from the power saving mode to the normal power mode occurs within the electronic device 10 (electronic device) (Step S11). In an example in which the USB device is a printer, the event may be a user's operation on an operation panel of the printer, reception of a print request from a PC connected over LAN, and so on. Note that the LAN connection differs from the USB connection.

Next, the control section 14 of the USB device returns the USB device from the power saving mode to the normal power mode (Step S12). More specifically, in response to occurrence of a specific event within the electronic device 10 in the power saving mode, the control section 14 switches the electronic device 10 into the normal power mode.

Next, the control section 14 of the USB device informs the USB host that the USB device has returned to the normal power mode. More specifically, the control section 14 controls the switch 12 to turn off, thereby disabling the pull-up of the signal line D+ or D− (Step S13). As a result, the potential of the signal line D+ or D− having been pulled up is decreased.

Next, the control section of the USB host detects that the potential of the signal line D+ or D− has decreased, and thus recognizes that the USB connection with the USB device is disconnected (Step S14).

Next, the control section 14 of the USB device controls the switch 12 to turn on, thereby re-enabling the pull up of the signal line D+ or D− (Step S15).

Next, the control section of the USB host detects the pull-up of the signal line D+ or D− and thus recognizes that the USB connection is re-established. In short, the control section of the USB host recognizes that a new USB connection is established (Step S16).

Next, the control section 14 of the USB device and the control section of the USB host perform a connection process in the same manner as when a USB cable is connected (Steps S17 and S18).

Upon completion of the connection process, the control section of the USB host resumes transmission of a status request to the USB device (Step S19).

Next, the transmission-reception section 11 of the USB device receives the status request (Step S20).

Next, the control section 14 of the USB device collects information about the USB device (Step S21) and transmits the information as the status response (Step S21).

Next, the control section of the USB host receives the status response from the USB device (Step S22).

Up to this point, the description is given of the flow of processing performed when the host computer (USB host) resumes transmission of a status request to the electronic device 10 (USB device).

As has been described above with reference to FIGS. 1 to 3, with respect to the USB connection compliant with the USB specification up to the version 2.0, the USB device according to the present disclosure can inform occurrence of an event to the host computer without receiving a status request from the host computer.

[Supplemental]

The present disclosure is not limited to the embodiment described above. It should be naturally appreciated that various alterations may be made without departing from the essence of the present disclosure.

What is claimed is:

1. An electronic system comprising:
   a USB host; and
   a USB device that includes
   a transmission-reception section for communicating with the USB host through a USB cable having a signal line D+ and a signal line D−, wherein
   the USB device is switchable between a normal power mode and a power saving mode,
   the electronic system performs a process for switching the USB device from the normal power mode to the power saving mode, the process including:
      transmitting, via the USB host, a status request to the USB device;
      receiving, via the USB device, the status request through the transmission-reception section;
      transmitting, via the USB device and to the USB host, a status response indicating that the USB device is in a status switchable to the power saving mode if the USB device is in the status switchable to the power saving mode;
      receiving, via the USB host, the status response indicating that the USB device is in the status switchable to the power saving mode;
      suspending, via the USB host, transmission of the status request to the USB device; and
      switching, via the USB device, the USB device to the power saving mode after the transmission of the status request has been suspended via the USB host,
   the USB device further includes:
   a pull-up resistor for pulling up a potential of the signal line D+ or the signal line D− to a predetermined level so as to allow the USB host to detect a speed of the communication with the USB host; and
   a switch for enabling or disabling the pull-up by the pull-up resistor, and
   the electronic system performs a process for resuming the transmission of the status request to the USB device via the USB host, the process including:
      switching, via the USB device, the USB device from the power saving mode to the normal power mode in response to occurrence of a specific event within the USB device in the power saving mode;
      controlling, via the USB device, the switch to turn off, thereby disabling the pull-up of the potential of the signal line D+ or the signal line D−;
      detecting, via the USB host, that the potential of the signal line D+ or the signal line D− has decreased, thereby recognizing that a USB connection with the USB device is disconnected;
      controlling, via the USB device, the switch to turn on, thereby re-enabling the pull-up of the potential of the signal line D+ or the signal line D−;
      detecting, via the USB host, the pull-up of the potential of the signal line D+ or the signal line D−, thereby recognizing that a new USB connection with the USB device is established;
      performing, via the USB host, a connection process for connection between the USB host and the USB device in the same manner as when a new connection of the USB cable is established;
      resuming, via the USB host, the transmission of the status request to the USB device when the connection process is complete;
      receiving, via the USB device, the status request;
      collecting, via the USB device, information about the USB device;
      transmitting, via the USB device, the information as the status response to the USB host; and
      receiving, via the USB host, the status response from the USB device.

2. The electronic system according to claim 1, wherein the USB device informs, through the pull-up by the pull-up resistor, the USB host about the speed of the communication between the transmission-reception section and the USB host.

3. The electronic system according to claim 1, wherein the specific event is an operation on the USB device by a user.

* * * * *